May 24, 1949. W. K. SEITZ 2,470,873
AIRPLANE TIRE VALVE RELEASE MECHANISM
Filed May 11, 1945

W. K. Seitz
INVENTOR

Arthur Minnick
ATTORNEY

Patented May 24, 1949

2,470,873

UNITED STATES PATENT OFFICE 2,470,873

AIRPLANE TIRE VALVE RELEASE MECHANISM

Walter Kenneth Seitz, Tampa, Fla.

Application May 11, 1945, Serial No. 593,245

5 Claims. (Cl. 152—415)

The present invention has for its primary object to provide means whereby airplane tires may have high pressure for the take-off of the plane from the ground and may have a predetermined lower pressure for landing.

Other factors being equal, the amount of lift of the aerofoil of an airplane is dependent upon the speed of its movement through the air. An airplane must attain a certain speed within the length of its runway before the lift becomes sufficient for the take-off. To this end, the runways are made long, straight, and smooth, and the airplane is equipped with wheels having pneumatic tires, while for greatest efficiency, these tires are well inflated.

The size of the wheels and of the tires has steadily been made greater for larger planes and heavier loads. Tire pressures of one hundred fifty pounds have been thought necessary to enable some planes to take off within the limit of the runway.

Such a pressure is advantageous in speeding to leave the ground, but when the plane must make its landing, and especially with heavy loads, the impact of the great momentum imposes a strain on the tires that is often beyond their strength to resist and blow-outs have not been infrequent. A maximum of seventy-five pounds air pressure has been set by some authorities for safe landing to avoid excessive waste of tires, though this pressure is often not great enough to reach a proper speed for a good take-off on some runways.

The present invention provides a simple, inexpensive, and efficient device enabling the tires of an airplane to be inflated safely to a pressure of one hundred fifty pounds or more for leaving the ground and having means automatically actuated to allow the escape of a predetermined amount of air from the tires, so that the remaining air pressure will not exceed seventy-five pounds, more or less, as desired for landing.

Essentially, the device comprises the usual tire casing, an inner tube in the casing for inflation to the pressure desired for landing, a supplemental tube, preferably within the first-mentioned tube and having one or more separate valves independent of the valve for the first tube, by which air may be forced into the supplemental tube, and a weight actuated by centrifugal force due to the rotation of the wheel during the run for the take-off, to overcome the resistance of a spring and to cause a release mechanism to be set which will operate only after the airplane is in the air and the wheel has stopped revolving, to allow air to escape from the valve or valves of the supplemental tube.

Figure 1:
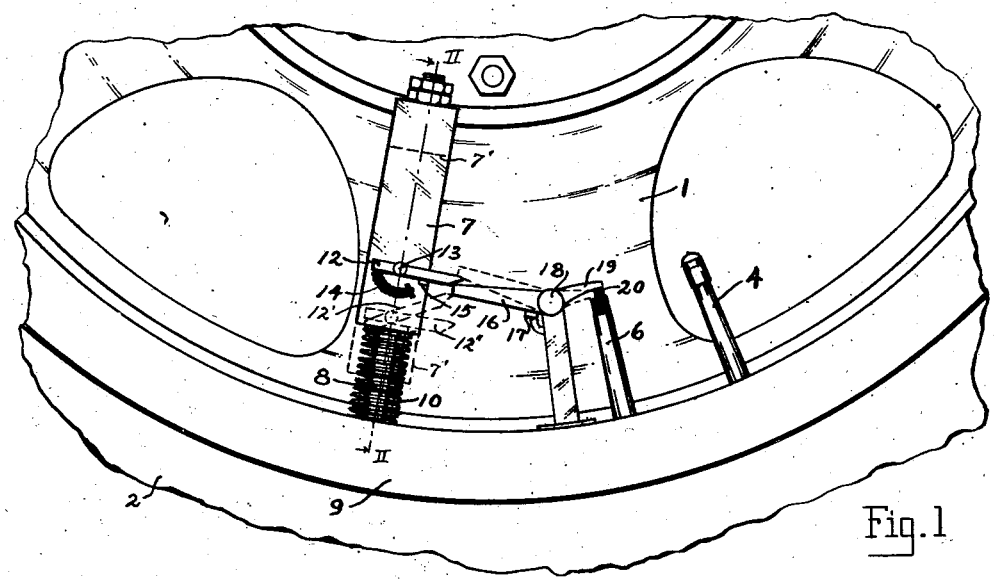
Figure 2:
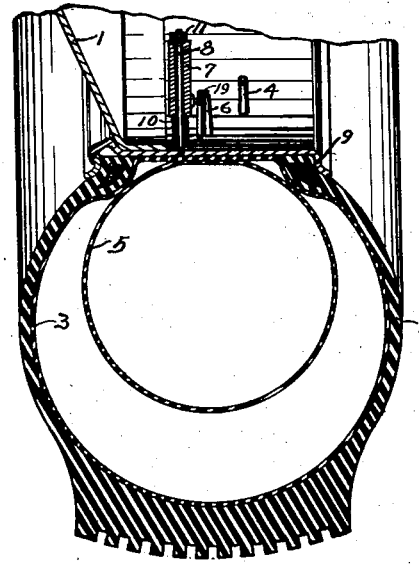
Figure 3:
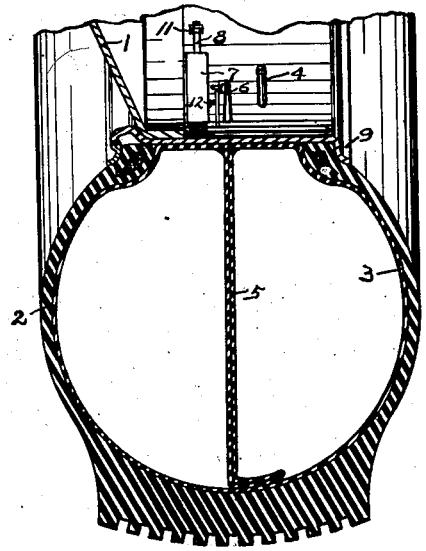

In the drawings, showing a preferred form of the invention chosen for purposes of illustration, Fig. 1 is a fragmentary elevation of the lower portion of a wheel on which is mounted a rubber tire casing; Fig. 2 is a section on the plane indicated by the line II—II of Fig. 1, the scale being one-third that of Fig. 1, both inner tubes being inflated; and Fig. 3 is a similar section showing the supplemental inner tube deflated.

On the wheel 1 is mounted a tire casing 2 within which is an inner tube 3 having a valve stem 4, all of any usual or suitable construction. As best seen in Fig. 2, a supplemental tube 5 is mounted inside of the tube 3, and this tube 5 needs to have a capacity of only about half that of the tube 3. Air will be forced into the tube 3 through its valve 4 until the pressure in the casing is that desired to be used when the airplane will make its landing on the ground. When the tube 3 is inflated and the tube 5 is empty, the pressure of the air in tube 3 will cause the walls of the tube 5 to be collapsed, but the lower portion of tube 5 will be free to move under the action of gravity to hang down in the lower part of the tube 3 as shown in Fig. 3.

After the tube 3 has been inflated to the desired landing pressure, its valve 4 will be closed in the usual manner and air will then be forced into the tube 5 through its valve stem 6. The pressure of the air within the tube 3 will be equal on all sides of the tube 5 which will assume its normal circular section when the pressure on the inside is equal to that outside. If the diameters of the two tubes are in the ratio of about five to seven as shown, the volumes will be about two to one and when the inner supplemental tube has been inflated to occupy half of the space in the tube 3, the pressure within the casing will have been doubled.

A weight 7 is slidably mounted on a guide rod 8 set radially of the wheel 1 and secured to the rim 9. A coiled spring 10 surrounding the rod 8 between the weight and the rim normally causes the weight to engage the stop nuts 11. On one side of the weight, is a bar 12 pivoted at 13 and having a spring 14 which acts to hold the bar against a stop 15. A lever arm 16 beneath the bar 12 rests on a stop 17 and on the other side of the pivot 18 for the arm is the lever arm 19 resting on top of the rod 20 of the valve piston in the valve stem 6 of the tube 5.

As the wheel 1 rotates on its axle during its run along the runway, the centrifugal force exerted on the weight 7 will cause it to move radially outward on its guide rod, as indicated by broken lines at 7' in Fig. 1 and in solid lines in Fig. 3, compressing the spring 10. The bar 12 will tilt on its pivot until it can pass the outer end of the lever arm 16 as indicated at 12' in Fig. 1. The spring 14 will then act to snap the bar back against the stop 15 with its outer end below the lever arm 16 as at 12''. When the wheel slows down, the spring 10 will overcome the force acting on the weight 7 and will press it back toward its stop nuts 11. The bar 12, engaging the arm 16 will cause it to swing on its pivot 18 to press and hold the arm 19 down upon the rod 20 to allow the air to escape from the tube 5, as indicated in the broken line position of the arms 16 and 19 in Fig. 1.

With the release of pressure from the supplemental tube 5, the air in the tube 3 will return to the pressure to which it was originally inflated, which was considered to be the proper tire pressure for landing the plane with its load.

To guard against failure of a single release mechanism and to balance the wheel, two or three of the devices will preferably be used, spaced at equal intervals around the rim.

I claim:

1. In combination, a wheel for an airplane, a casing upon the wheel, a tube within the casing having a valve for inflation thereof to provide the pressure in the casing desired at the landing of the airplane, a supplemental tube within the said inner tube and having an independent valve whereby the supplemental tube may be inflated to increase the pressure within the casing as desired for efficient take-off of the airplane from the ground, a weight mounted for movement away from the axle of the wheel and actuated by centrifugal force due to rotation of the wheel, a spring mounted to resist the outward movement of the weight and means actuated by the spring when the centrifugal force decreases to cause release of the air pressure in the supplemental tube.

2. In a pneumatic tire for an airplane wheel, a casing, an inner tube within the casing for inflation to a pressure suitable for landing the plane, a supplemental tube within the casing having a valve independent of the first-mentioned tube for inflation of the supplemental tube to furnish additional pressure in the casing to an amount suitable for efficient take-off of the airplane, a weight mounted for movement outward from the axis of the wheel under the action of centrifugal force caused by rotation of the wheel during the run for the take-off and means actuated by movement of the weight to release the air from the supplemental tube after the centrifugal force ceases to act.

3. In combination, a wheel, a tire casing on the wheel, an inner tube in the casing, a supplemental tube in the casing, a weight mounted on the wheel for outward movement when acted upon by centrifugal force caused by rotation of the wheel, a spring mounted to resist outward movement of the weight, a movable element carried by the weight, a pivoted lever having one arm in the path of movement of the movable element and having the other arm adapted for engagement with the valve, the arrangement being such that outward movement of the weight will carry the movable element past the arm of the lever, and return movement of the weight caused by the spring will act to tilt the lever to open the valve to release air from the supplemental tube.

4. In combination, a wheel, a tire casing on the wheel, two inner tubes within the casing, each having a valve through which the respective tubes may be inflated, a weight mounted to be moved outward from the axis of the wheel by centrifugal force due to rotation of the wheel, means to cause the weight to move inward when the centrifugal force is reduced, and means actuated by the weight during its inward movement to release air from one of the tubes.

5. In combination, a wheel, a tire casing on the wheel, two inner tubes within the casing, each having a valve through which the respective tubes may be inflated, a weight mounted for movement with respect to the wheel by the action of centrifugal force due to rotation of the wheel and means actuated by the moving weight to cause one of the two valves to be opened to release the air pressure within one tube.

WALTER KENNETH SEITZ.

REFERENCES CITED

The following references are of record in the file of this patent:

UNITED STATES PATENTS

| Number | Name | Date |
|---|---|---|
| 529,736 | Jenness | Nov. 27, 1894 |
| 2,012,773 | Rockman | Aug. 27, 1935 |